(12) United States Patent
Hirokubo

(10) Patent No.: US 11,774,744 B2
(45) Date of Patent: Oct. 3, 2023

(54) SPECTRAL APPARATUS AND METHOD OF DRIVING SPECTRAL APPARATUS

(71) Applicant: SEIKO EPSON CORPORATION, Tokyo (JP)

(72) Inventor: Nozomu Hirokubo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 342 days.

(21) Appl. No.: 16/953,584

(22) Filed: Nov. 20, 2020

(65) Prior Publication Data

US 2021/0157125 A1    May 27, 2021

(30) Foreign Application Priority Data

Nov. 22, 2019   (JP) ................................ 2019-211163

(51) Int. Cl.
| | |
|---|---|
| G02B 26/00 | (2006.01) |
| G02B 5/28 | (2006.01) |
| G01J 3/02 | (2006.01) |
| G01J 3/26 | (2006.01) |

(52) U.S. Cl.
CPC ............ G02B 26/007 (2013.01); G01J 3/027 (2013.01); G01J 3/26 (2013.01); G02B 5/286 (2013.01); G02B 26/001 (2013.01)

(58) Field of Classification Search
CPC .. G01J 3/027; G01J 3/26; G02B 5/286; G02B 26/001
USPC ....................................................... 356/454
See application file for complete search history.

(56) References Cited

U.S. PATENT DOCUMENTS

| | | | |
|---|---|---|---|
| 2013/0114083 A1 | 5/2013 | Sano | |
| 2015/0208911 A1* | 7/2015 | Funamoto | ............... A61B 3/12 362/293 |
| 2015/0212314 A1* | 7/2015 | Kuri | ....................... G02B 5/00 359/578 |

FOREIGN PATENT DOCUMENTS

| | | |
|---|---|---|
| JP | H0194312 A | 4/1989 |
| JP | 2002277640 A | 9/2002 |
| JP | 2013101071 A | 5/2013 |
| JP | 2015141209 A | 8/2015 |

OTHER PUBLICATIONS

Office Action for JP Patent Application No. JP2019211163, dated Jun. 13, 2023.

* cited by examiner

*Primary Examiner* — Tarifur R Chowdhury
*Assistant Examiner* — Omar H Nixon
(74) *Attorney, Agent, or Firm* — CHIP LAW GROUP

(57) ABSTRACT

A spectral apparatus includes: an interference filter that includes a pair of reflection films and outputs light having a spectral wavelength corresponding to a gap size between the pair of reflection films; a gap sensor that detects the gap size; and one or more processors configured to detect an error based on a difference between the spectral wavelength corresponding to the gap size detected by the gap sensor and a target wavelength of light to be output from the interference filter. The one or more processors detect an error when an integration value obtained by integrating, on a time axis, an absolute value of the difference exceeds a threshold value.

9 Claims, 5 Drawing Sheets

SPECTRAL APPARATUS AND METHOD OF DRIVING SPECTRAL APPARATUS

The present application is based on, and claims priority from JP Application Serial Number 2019-211163, filed Nov. 22, 2019, the disclosure of which is hereby incorporated by reference herein in its entirety.

BACKGROUND

1. Technical Field

The present disclosure relates to a spectral apparatus and a method of driving a spectral apparatus.

2. Related Art

In related art, there is known a spectral apparatus that includes an interference filter including a pair of reflection films disposed to face each other and a control unit for controlling the interference filter (refer to, for example, JP-A-1-94312).

The spectral apparatus (variable interference apparatus) described in JP-A-1-94312 includes an interference filter (Fabry-Perot interference unit), a control circuit, and a capacitance detection circuit. The interference filter includes a pair of reflection films, a piezoelectric element that changes a gap size between the pair of reflection films, and an electrode for detecting capacitance. The control circuit of the spectral apparatus feedback-controls a voltage applied to the piezoelectric element based on capacitance detected by the capacitance detection circuit. Thereby, the control circuit can control the interference filter such that an actual spectral wavelength of light passing through the interference filter approaches a target wavelength which is set.

On the other hand, in the spectral apparatus described in JP-A-1-94312, a wavelength shift is prevented by feedback control. However, when a disturbance with a large impact force equal to or larger than an allowable value is applied, the gap size between the reflection films is changed, and as a result, a wavelength shift occurs. Thus, processing cannot be properly performed.

For example, when the spectral apparatus is used as a spectral measurement apparatus, alight reception unit that receives light dispersed by the interference filter is provided. In this case, the interference filter disperses light having a target wavelength, and the light reception unit receives the dispersed light having the target wavelength. Thus, an amount of the light having the target wavelength can be measured. However, during measurement of an amount of the light, when a disturbance is applied to the interference filter or the wavelength of the light dispersed by the interference filter is shifted from the target wavelength, the wavelength of the light received by the light reception unit is also shifted. As a result, an amount of the light having the target wavelength cannot be properly measured.

For this reason, in related art, in the spectral apparatus, the capacitance detection circuit detects capacitance according to the gap size between the reflection films. In a case where the capacitance is changed by a predetermined value or more, it is determined that a wavelength shift occurs, and a control for outputting an error is performed.

However, when error detection is performed based on an amount of a wavelength shift, an error due to a wavelength shift may be deviated from an actual influence. For example, when the spectral apparatus is used as a spectral measurement apparatus, the light reception unit continues to receive the dispersed light for a predetermined measurement period and measures an amount of the light. Here, when error detection is performed based on only the amount of the wavelength shift, even when the wavelength shift having a value equal to or larger than a predetermined value occurs during a very short period of the measurement period, an error is detected. However, when a period for which the wavelength shift occurs is sufficiently shorter than the measurement period, the wavelength shift does not have a large influence on measurement accuracy. On the contrary, when a wavelength shift having a value equal to or smaller than a predetermined value occurs in many of the measurement period, an error is not detected, but the light reception unit receives a large amount of light having a wavelength different from the target wavelength. As a result, measurement accuracy is decreased.

SUMMARY

A spectral apparatus according to a first aspect includes: an interference filter that includes a pair of reflection films and outputs light having a spectral wavelength corresponding to a gap size between the pair of reflection films; a gap sensor that detects the gap size; and one or more processors configured to detect an error based on a difference between the spectral wavelength corresponding to the gap size detected by the gap sensor and a target wavelength of light to be output from the interference filter, in which the one or more processors detect an error when an integration value obtained by integrating, on a time axis, an absolute value of the difference exceeds a threshold value.

A spectral apparatus according to a second aspect includes: an interference filter that includes a pair of reflection films and outputs light having a spectral wavelength corresponding to a gap size between the pair of reflection films; a gap sensor that detects the gap size; and one or more processors configured to detect an error based on a second value obtained by adding a predetermined first value to the target wavelength to be output from the interference filter, a third value obtained by subtracting the first value from the target wavelength, and the spectral wavelength corresponding to the gap size detected by the gap sensor, in which the one or more processors detect an error when a sum of a first integration value and a second integration value exceeds a threshold value, the first integration value being obtained by integrating an absolute value of a difference between the spectral wavelength exceeding the second value and the second value, and the second integration value being obtained by integrating an absolute value of a difference between the spectral wavelength below the third value and the third value.

A method of driving a spectral apparatus according to a third aspect includes an interference filter that includes a pair of reflection films and outputs light having a spectral wavelength corresponding to a gap size between the pair of reflection films, and a gap sensor that detects the gap size, the method including: detecting an error when an integration value exceeds a threshold value, the integration value being obtained by integrating an absolute value of a difference between the spectral wavelength corresponding to the gap size detected by the gap sensor and a target wavelength of light to be output from the interference filter.

A method of driving a spectral apparatus according to a fourth aspect includes an interference filter that includes a pair of reflection films and outputs light having a spectral wavelength corresponding to a gap size between the pair of reflection films, and a gap sensor that detects the gap size, the method including: detecting an error when a sum of a first integration value and a second integration value exceeds a threshold value, based on a second value obtained by adding a predetermined first value to the target wavelength to be output from the interference filter, a third value obtained by subtracting the first value from the target wavelength, and the spectral wavelength corresponding to the gap size detected by the gap sensor, the first integration value being obtained by integrating an absolute value of a difference between the spectral wavelength exceeding the second value and the second value, and the second integration value being obtained by integrating an absolute value of a difference between the spectral wavelength below the third value and the third value.

DESCRIPTION OF EXEMPLARY EMBODIMENTS

First Embodiment

Hereinafter, a spectral apparatus according to a first embodiment will be described.

Figure 1:
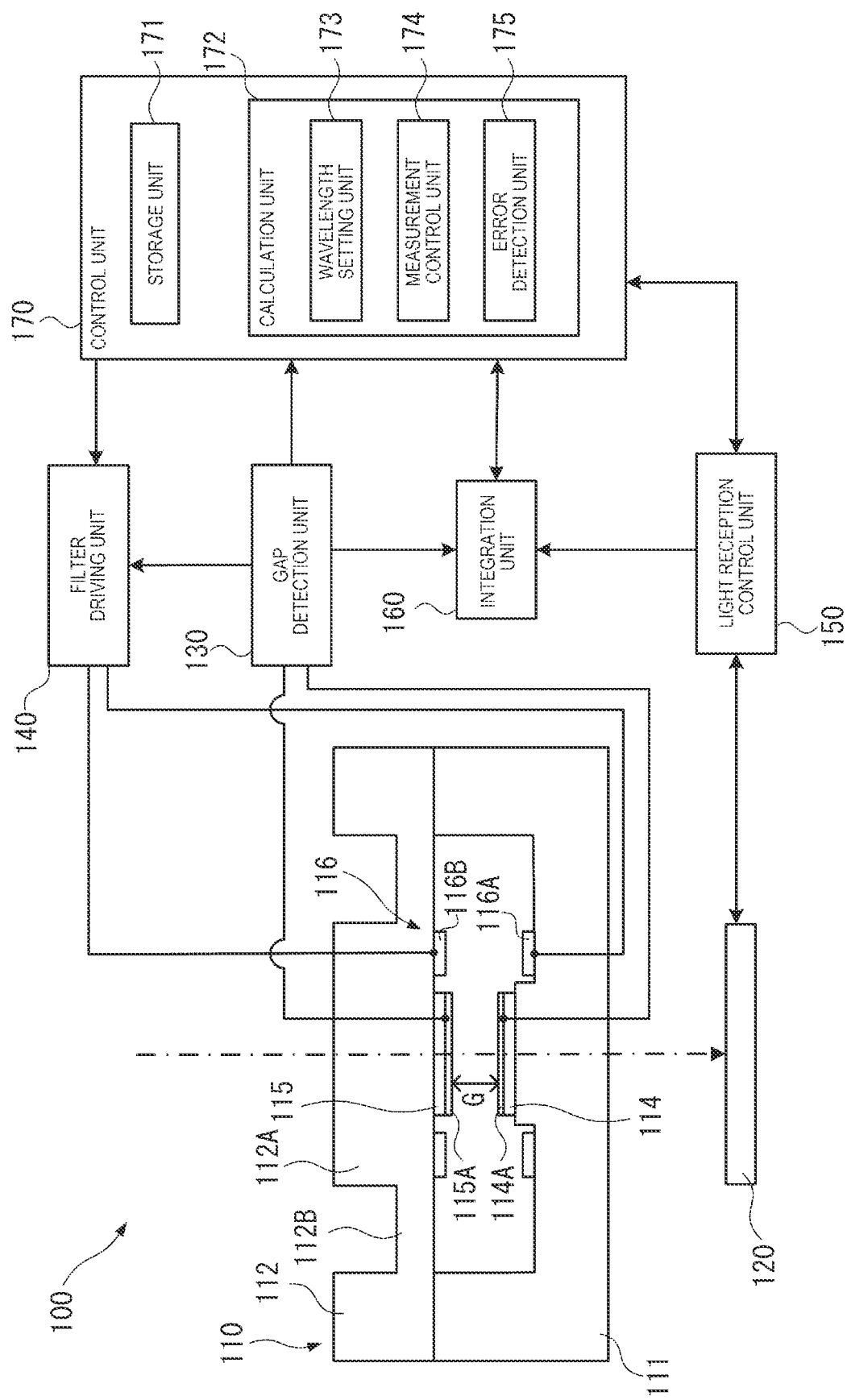
FIG. 1 is a schematic diagram illustrating a schematic configuration of a spectral apparatus according to a first embodiment.

FIG. 1 is a schematic diagram illustrating a schematic configuration of a spectral apparatus 100 according to the present embodiment.
Overall Configuration of Spectral Apparatus 100

The spectral apparatus 100 is an apparatus that disperses light having a desired target wavelength from incident light input from a measurement target and measures an amount of the dispersed light. As illustrated in FIG. 1, the spectral apparatus 100 includes an interference filter 110, a light reception unit 120, a gap detection unit 130, a filter driving unit 140, a light reception control unit 150, an integration unit 160, and a control unit 170.

Hereinafter, each component will be described in detail.
Configuration of Interference Filter 110

As illustrated in FIG. 1, the interference filter 110 includes a transparent first board 111 and a transparent second board 112. The first board 111 and the second board 112 are integrally configured by being bonded to each other by a bonding film such as a plasma-polymerized film containing siloxane as a main component.

A first reflection film 114, which is one of a pair of reflection films, is provided on a surface of the first board 111 facing the second board 112. The first reflection film 114 may be formed of a metal film or a metal alloy film, or may be formed of a dielectric multilayer film.

A first capacitor electrode 114A formed of a transparent electrode such as ITO is provided on a front surface of the first reflection film 114.

A first electrode 116A is provided on a surface of the first board 111 facing the second board 112. The first electrode 116A is disposed, for example, so as to surround an outer circumference of the first reflection film 114, and faces a second electrode 116B provided on the second board 112. When a voltage is applied to the first electrode 116A and the second electrode 116B, an electrostatic actuator 116 (gap changing unit), which changes a size of a gap G (gap size) between the first reflection film 114 and the second reflection film 115 by an electrostatic attraction force, is operated.

The second board 112 has an annular-shaped recess groove formed on a surface opposite to the first board 111, and includes a movable portion 112A which is provided inside the annular-shaped recess groove and a diaphragm portion 112B which is a bottom surface of the recess groove.

A second reflection film 115, which is the other of the pair of reflection films, is provided on a surface of the movable portion 112A facing the first board 111. The second reflection film 115 faces the first reflection film 114 provided on the first board 111 via the gap G. The second reflection film 115 is formed of the same material as the first reflection film 114, and is formed of, for example, a metal film, a metal alloy film, or a dielectric multilayer film. A second capacitor electrode 115A is provided on a surface of the second reflection film 115 facing the first reflection film 114.

The second electrode 116B is provided on a surface of at least one of the movable portion 112A and the diaphragm portion 112B of the second board 112, the surface facing the first electrode 116A. The electrostatic actuator 116 is configured with the first electrode 116A and the second electrode 116B.

In the above-described interference filter 110, when a voltage is applied between the first electrode 116A and the second electrode 116B, an electrostatic attraction force acts between the electrodes, and thus, the movable portion 112A is displaced toward the first board 111 side. Thereby, the size of the gap G can be changed.

In FIG. 1, although the interference filter 110 includes one electrostatic actuator 116, the present disclosure is not limited thereto. For example, the interference filter 110 may include an inner electrostatic actuator, which is provided so as to surround outer sides of the first reflection film 114 and the second reflection film 115, and an outer electrostatic actuator, which is provided outside the inner electrostatic actuator. In this case, the movable portion 112A may be coarsely controlled by applying a bias voltage to one of the inner electrostatic actuator and the outer electrostatic actuator, and the movable portion 112A may be finely controlled by applying a control voltage to the other one of the inner electrostatic actuator and the outer electrostatic actuator.
Configuration of Light Reception Unit 120

The light reception unit 120 includes a photoelectric conversion element that receives light passing through the interference filter 110. The light reception unit 120 may include an imaging element that includes a plurality of pixels and outputs a spectral image by detecting an amount of light received by each pixel. In a case where an imaging element is used as the light reception unit 120, preferably, an optical system that focuses the light passing through the interference filter 110 on the light reception unit 120 is provided between the light reception unit 120 and the interference filter 110.

When receiving the light passing through the interference filter 110, the light reception unit 120 outputs a light reception signal according to the amount of the received light, to the light reception control unit 150. The light reception signal is output to the control unit 170 via the light reception control unit 150.

Gap Detection Unit 130

The gap detection unit 130 is electrically coupled to the first capacitor electrode 114A and the second capacitor electrode 115A, and a gap sensor is configured with the gap detection unit 130, the first capacitor electrode 114A, and the second capacitor electrode 115A. The gap detection unit 130 is a capacitance detection circuit that detects capacitances of the first capacitor electrode 114A and the second capacitor electrode 115A. The capacitances of the first capacitor electrode 114A and the second capacitor electrode 115A are inversely proportional to the size of the gap G. Thus, detecting of the capacitances means detecting the gap size between the first reflection film 114 and the second reflection film 115.

The gap detection unit 130 also outputs a detection signal corresponding to the detected capacitances, to the filter driving unit 140, the integration unit 160, and the control unit 170.

Configuration of Filter Driving Unit 140

The filter driving unit 140 changes a wavelength of the light passing through the interference filter 110 by controlling a driving voltage applied to the electrostatic actuator 116 of the interference filter 110.

The filter driving unit 140 is coupled to the gap detection unit 130 and the control unit 170. The filter driving unit 140 feedback-controls the voltage applied to the electrostatic actuator 116 based on a difference signal between a target instruction signal indicating a target wavelength $\lambda_0$ input from the control unit 170 and a detection signal input from the gap detection unit 130. That is, the filter driving unit 140 functions as a feedback control unit that feedback-controls the voltage applied to the electrostatic actuator 116 such that a spectral wavelength A of the light passing through the interference filter 110, which corresponds to the gap size detected by the gap detection unit 130, becomes the target wavelength $\lambda_0$ indicated by the target instruction signal.

As described above, the interference filter 110 may include a first electrostatic actuator and a second electrostatic actuator. In this case, preferably, the filter driving unit 140 includes a bias voltage applying unit that applies a bias voltage to one of the first electrostatic actuator and the second electrostatic actuator, and a control voltage applying unit that applies a control voltage to the other of the first electrostatic actuator and the second electrostatic actuator. Thereby, the control voltage applying unit can feedback-control the control voltage based on a difference between the detection signal from the gap detection unit 130 and the target instruction signal from the control unit 170.

Configuration of Light Reception Control Unit 150

The light reception control unit 150 performs signal processing of the light reception signal which is input from the light reception unit 120, and outputs the processed light reception signal to the control unit 170. That is, although not illustrated, the light reception control unit 150 includes signal processing circuits including an amplifier that amplifies a signal voltage of the light reception signal, an AD converter that converts an analog signal into a digital signal, and the like, and outputs the light reception signal processed by the signal processing circuits to the control unit 170.

The light reception control unit 150 controls measurement processing in the light reception unit 120 based on a control of the control unit 170. Specifically, the light reception control unit 150 controls the light reception unit 120 to output a light reception signal according to an amount of light received in a predetermined measurement period from a predetermined measurement start timing.

That is, in the present embodiment, the size of the gap G of the interference filter 110 is changed by applying a driving voltage to the electrostatic actuator 116. At this time, in the interference filter 110, the movable portion 112A vibrates due to a spring force of the diaphragm portion 112B, and the size of the gap G is changed. While the size of the gap G is changed, the wavelength of the light passing through the interference filter 110 is also changed. Therefore, the light reception control unit 150 sets the light reception unit 120 in a standby state for a predetermined standby period until a change in the size of the gap G is settled, and starts measurement processing at an end timing of a standby period as a measurement start timing.

The light reception control unit 150 outputs a start trigger signal indicating the measurement start timing and an end trigger signal indicating an end timing of a measurement period, to the integration unit 160.

Configuration of Integration Unit 160

The integration unit 160 receives the detection signal from the gap detection unit 130, generates an integration signal based on the input detection signal, and outputs the integration signal to the control unit 170.

Specifically, when the start trigger signal is input from the light reception control unit 150, the integration unit 160 outputs, to the control unit 170, an integration signal based on the detection signal input from the gap detection unit 130 in a period until the end trigger signal is input. The integration signal is a signal indicating an integration value I obtained by integrating, on a time axis, a wavelength shift amount $|\lambda-\lambda_0|$, which is an absolute value of a difference between the spectral wavelength $\lambda$ of the light passing through the interference filter 110 and the target wavelength $\lambda_0$.

The integration unit 160 may be configured by a microcomputer. By executing a predetermined program, the microcomputer may calculate the spectral wavelength corresponding to the detection signal, and calculate the integration value of the absolute value of the difference between the target wavelength and the spectral wavelength by calculation. Further, a calculation unit 172 of the control unit 170 may function as the integration unit 160.

Alternatively, the integration unit 160 may be configured with a plurality of arithmetic circuits. In this case, the integration unit 160 may include a signal processing circuit that performs predetermined signal processing on the detection signal, a subtraction circuit that calculates a signal value difference between the processed detection signal and the target instruction signal, an absolute value circuit that calculates an absolute value of the signal value difference, and an integration circuit that integrates the absolute value of the signal value difference.

Configuration of Control Unit 170

The control unit 170 is configured with an arithmetic circuit and a storage circuit, and controls the entire operation of the spectral apparatus 100. The control unit 170 is coupled to an interface (not illustrated) that couples the spectral apparatus 100 and an external apparatus, and can also receive a signal from the external apparatus. The signal from the external apparatus may be, for example, a signal designating the target wavelength $\lambda_0$ of the light dispersed by the spectral apparatus 100. The spectral apparatus 100 may include an operation unit that receives an input operation by a user, and in this case, an operation signal from the operation unit may be input to the control unit 170.

As illustrated in FIG. 1, the control unit 170 includes a storage unit 171 and a calculation unit 172.

The storage unit 171 is a storage device that stores various data and various programs, and is configured by, for example, a semiconductor memory.

The calculation unit 172 is configured with an arithmetic circuit such as a CPU, and functions as a wavelength setting unit 173, a measurement control unit 174, an error detection unit 175, and the like by reading and executing the program stored in the storage unit 171. As described above, the calculation unit 172 may function as the integration unit 160. All or some of the functions of the calculation unit 172 may be realized by a hardware circuit instead of the CPU that executes the program. In this specification, the calculation unit 172, regardless of whether it is realized by a CPU or a hardware circuit, may be referred to as one or more processors.

The wavelength setting unit 173 sets the target wavelength $\lambda_0$ of the light dispersed by the interference filter 110. For example, when the wavelength of the light dispersed by the spectral apparatus 100 is input from the external apparatus or the operation unit, the wavelength setting unit 173 sets the wavelength as the target wavelength $\lambda_0$.

The measurement control unit 174 reads a target voltage corresponding to the set target wavelength $\lambda_0$ from a drive table stored in the storage unit 171, and outputs a target instruction signal including the target voltage to the filter driving unit 140 and the integration unit 160.

The measurement control unit 174 outputs a measurement instruction signal to the light reception control unit 150 at the same time as outputting the target instruction signal to the filter driving unit 140. Thereby, the light reception unit 120 performs measurement processing of receiving the light having a spectral wavelength $\lambda$ passing through the interference filter 110 in a measurement period after a standby period in which a wavelength switching operation is performed in the interference filter 110.

Further, the measurement control unit 174 measures an amount of the light with respect to the target wavelength $\lambda_0$ of the measurement target based on the light reception signal which is input from the light reception unit 120 via the light reception control unit 150.

The error detection unit 175 detects an error in spectral measurement processing based on the integration signal input from the integration unit 160. The error described here means an occurrence of a wavelength shift having an influence on measurement accuracy in spectral measurement processing using the spectral apparatus 100.

In the spectral measurement using the interference filter 110, when an impact force such as a disturbance is applied during a measurement period of the light reception unit 120, the spectral wavelength $\lambda$ of the light passing through the interference filter 110 is shifted. In this case, due to the wavelength shift, the light reception unit 120 may receive light having a spectral wavelength $\lambda$ different from the target wavelength $\lambda_0$. On the other hand, even though a wavelength shift occurs, the wavelength shift may not influence measurement accuracy. For example, even when a wavelength shift amount is large, when a time when the wavelength shift occurs is sufficiently shorter than a measurement period, an influence on measurement accuracy is small.

Generally, when an error occurs, re-measurement is performed. When a wavelength shift having a small influence on measurement accuracy is detected as an error, even though the error does not influence measurement accuracy, re-measurement is performed with high frequency, and as a result, a time required for the spectral measurement processing becomes long.

Therefore, the error detection unit 175 according to the present embodiment determines whether or not the integration value indicated by the integration signal exceeds a predetermined threshold value, and detects an error when the integration value exceeds the threshold value. Thereby, it is possible to properly detect only the wavelength shift having a large influence on measurement accuracy.

Operation of Spectral Apparatus 100

Next, a method of driving the spectral apparatus 100 will be described.

Figure 2:
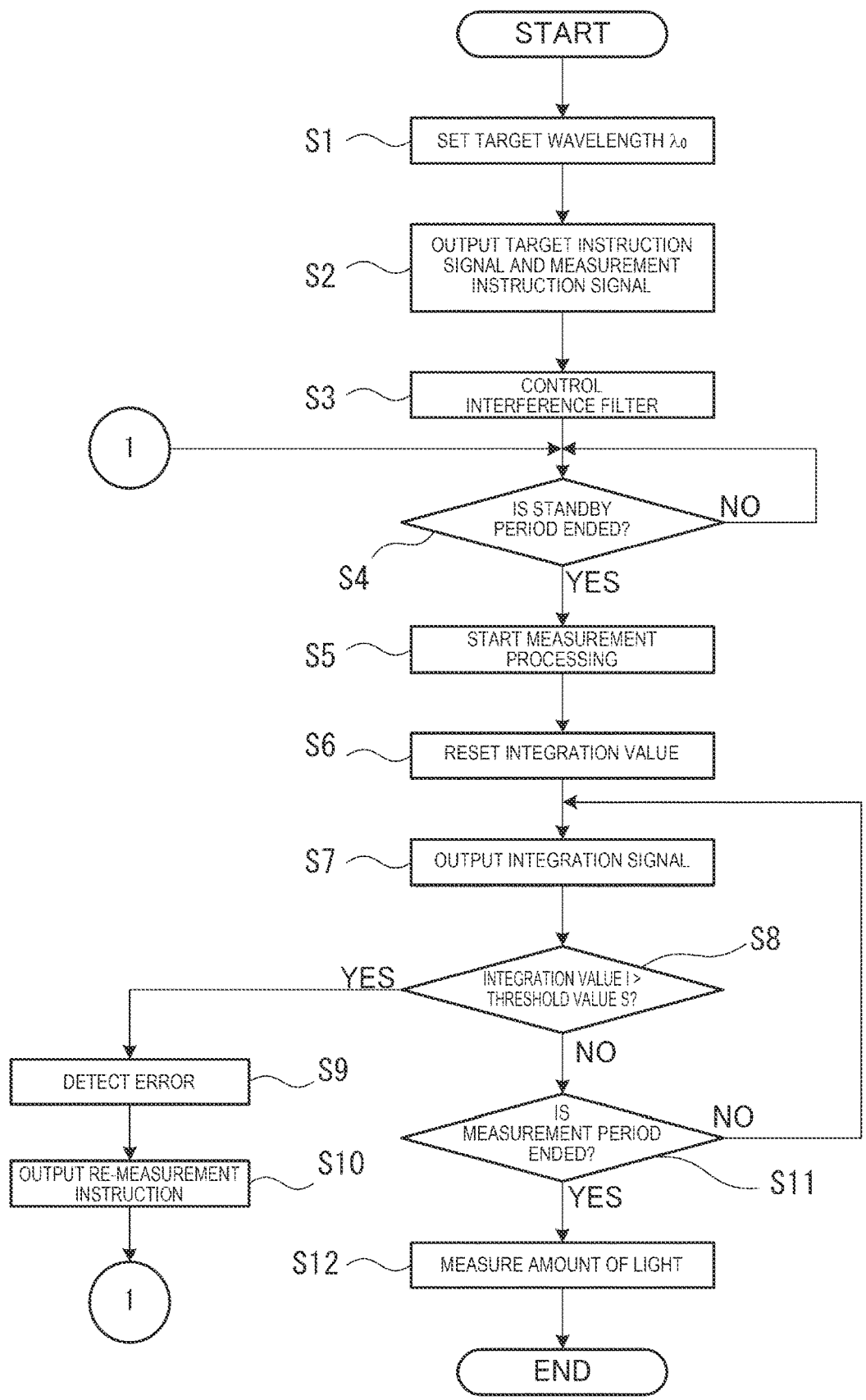
FIG. 2 is a flowchart of spectral measurement processing including a method of driving the spectral apparatus according to the first embodiment.

FIG. 2 is a flowchart of the spectral measurement processing including the method of driving the spectral apparatus 100 according to the present embodiment.

In a case where the spectral measurement processing is performed by the spectral apparatus 100, first, the wavelength setting unit 173 of the control unit 170 sets a target wavelength $\lambda_0$ (step S1). For example, the wavelength setting unit 173 may set a target wavelength $\lambda_0$ acquired from an external apparatus that is communicatively coupled to the control unit 170, or may set a target wavelength $\lambda_0$ which is input from the operation unit. Further, in a case of setting a spectral measurement wavelength of each wavelength with a predetermined wavelength interval, the wavelength setting unit 173 sets a preset target wavelength $\lambda_0$, and performs processing of step S2 to step S12 to be described. Thereafter, the wavelength setting unit 173 returns to step S1 again, sets a target wavelength $\lambda_0$, and repeats the spectral measurement processing. Thereby, it is possible to perform spectral measurement for each wavelength at predetermined intervals.

Next, the measurement control unit 174 outputs a target instruction signal corresponding to the set target wavelength $\lambda_0$ to the filter driving unit 140 and the integration unit 160, and outputs a measurement instruction signal to the light reception control unit 150 at the same time as outputting the target instruction signal (step S2).

When receiving the target instruction signal, the filter driving unit 140 applies a target voltage to the electrostatic actuator 116 of the interference filter 110, and feedback-controls the voltage applied to the electrostatic actuator 116 based on the detection signal input from the gap detection unit 130 and the target instruction signal (step S3). Thereby, in a standby period, the size of the gap G of the interference filter 110 is controlled to be a size corresponding to the target wavelength ho, and the light having the target wavelength ho passes through the interference filter 110.

When receiving the measurement instruction signal, the light reception control unit 150 counts a time from a timing when the measurement instruction signal is received. The light reception control unit 150 determines whether or not a preset period is elapsed from the receiving timing of the measurement instruction signal and a standby period is ended (step S4). In a case where a determination result in step S4 is No, the light reception control unit 150 waits until a standby period is ended. In a case where a determination result in step S4 is Yes, the light reception control unit 150 starts measurement processing in the light reception unit 120 and outputs a start trigger signal to the integration unit 160 (step S5).

When receiving the start trigger signal output in step S5, the integration unit 160 resets the integration value (step S6). The integration unit 160 integrates the wavelength shift amount $|\lambda-\lambda_0|$ I on the time axis, and outputs an integration signal according to the integration value I to the control unit 170 (step S7).

Figure 3:
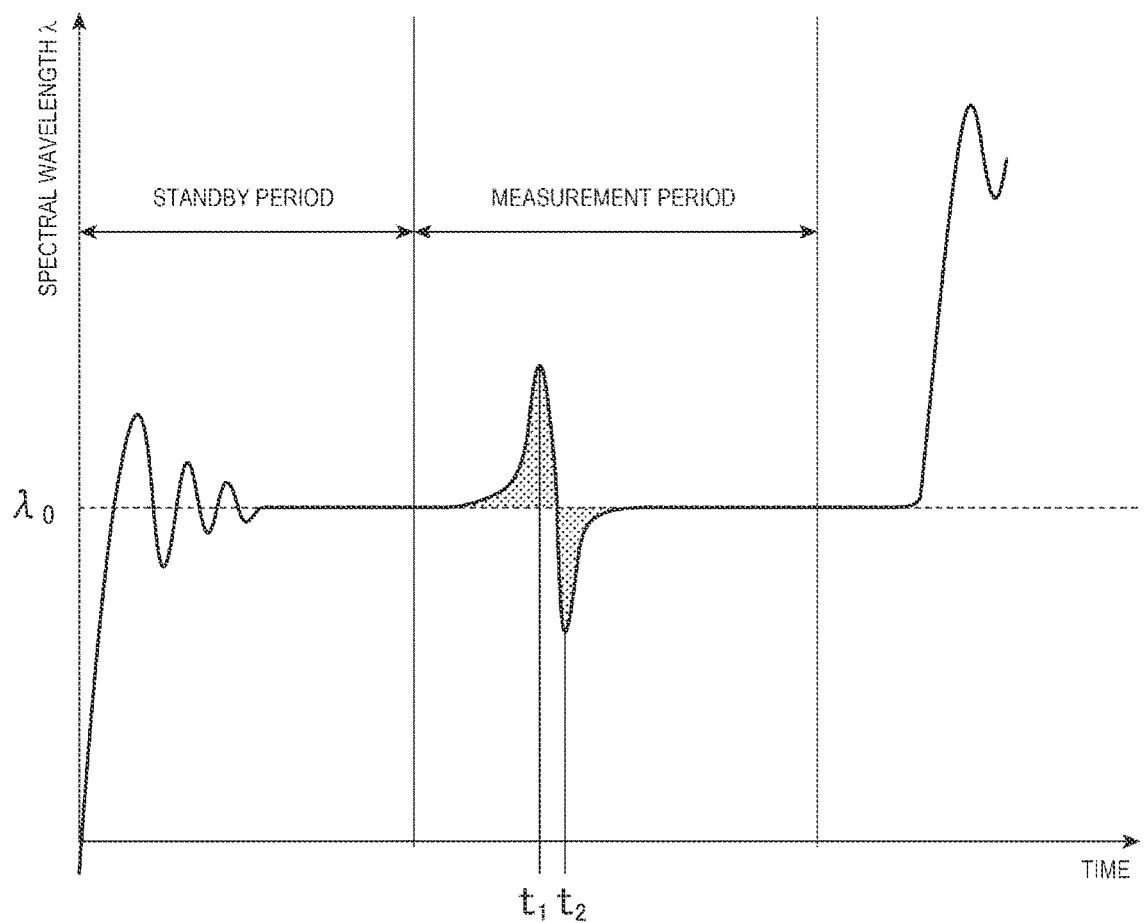
FIG. 3 is a graph illustrating an example of a change in spectral wavelength of light passing through an interference filter in the first embodiment.
Figure 4:
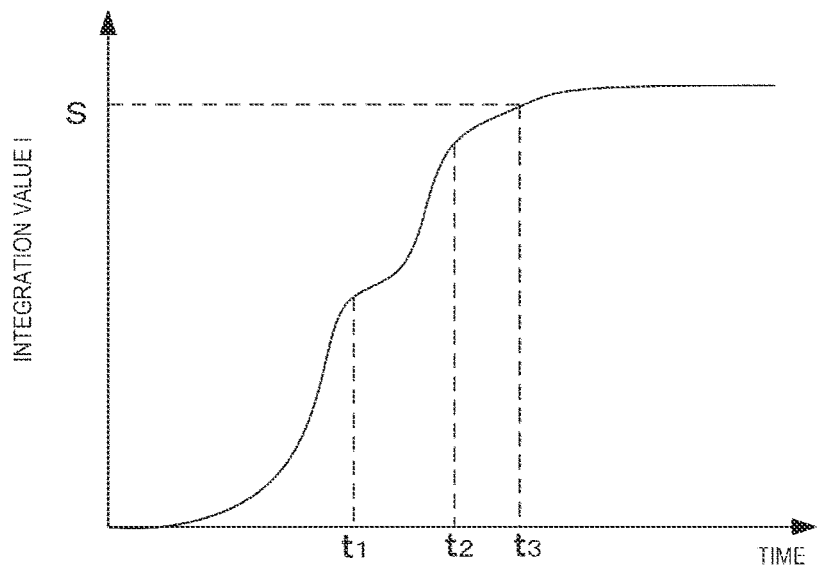
FIG. 4 is a graph illustrating an integration signal based on a detection signal output in a measurement period of FIG. 3.

FIG. 3 is a graph illustrating an example of a change in the spectral wavelength $\lambda$ of the light passing through the interference filter 110 in error detection according to the present embodiment. FIG. 4 is a graph illustrating an integration signal based on the detection signal output in the measurement period of FIG. 3.

In the example illustrated in FIG. 3, vibration is applied to the interference filter 110, and a wavelength shift having a peak at a time $t_1$ and a wavelength shift having a peak at a time $t_2$ occur. The integration value of the integration signal is an area surrounded by a shaded portion. Thus, when a wavelength shift occurs, as illustrated in FIG. 4, the integration value I indicated by the integration signal is integrated.

The error detection unit 175 monitors the integration signal output from the integration unit 160, and determines whether or not the integration value exceeds a predetermined threshold value S (step S8).

When a determination result in step S8 is Yes, the error detection unit 175 detects an error (step S9). That is, the error detection unit 175 determines that a wavelength shift having an influence on measurement accuracy of the spectral measurement is occurred. For example, in the example illustrated in FIG. 4, the integration value at a time $t_3$ exceeds the threshold value S, and thus, at a timing of the time $t_3$, an error is detected by the error detection unit 175.

In this case, the measurement control unit 174 outputs a re-measurement instruction signal for instructing re-measurement to the light reception control unit 150 (step S10). Thereby, the light reception control unit 150 returns to step S4, counts a time from the timing when the measurement instruction signal is received, and remeasures an amount of the light received by the light reception unit 120 in a measurement period.

In a case where a determination result in step S8 is No, the light reception control unit 150 determines whether or not a measurement period is ended (step S11). In a case where a determination result in step S11 is No, measurement processing in the light reception unit 120 is continued, and the process returns to step S7.

In a case where a determination result in step S11 is Yes, the light reception control unit 150 ends measurement processing in the light reception unit 120, performs signal processing of the light reception signal according to the amount of the received light that is input from the light reception unit 120, and outputs the processed light reception signal to the control unit 170. Thereby, the measurement control unit 174 measures an amount of the light with respect to the target wavelength $\lambda_0$, based on the light reception signal from the light reception control unit 150 (step S12).

Operation and Effect According to Present Embodiment

The spectral apparatus 100 according to the present embodiment includes the interference filter 110 including the first reflection film 114 and the second reflection film 115 that face each other with the gap G, the gap detection unit 130 that detects the size of the gap G, and the control unit 170. Further, the control unit 170 includes the error detection unit 175. The error detection unit 175 detects an error when the integration value I of the absolute value $|\lambda-\lambda_0|$ of the difference between the spectral wavelength $\lambda$ corresponding to the gap size detected by the gap detection unit 130 and the target wavelength $\lambda_0$ of the light output from the interference filter 110 exceeds the threshold value S.

Thereby, the error detection unit 175 can prevent excessive error detection.

That is, during a measurement period, even when an impact force such as a disturbance is applied to the interference filter 110 and, as a result, a wavelength shift in which the spectral wavelength $\lambda$ is shifted from the target wavelength $\lambda_0$ occurs, when the wavelength shift occurs only in a very short period, the wavelength shift has a small influence on measurement accuracy. In such a case, when an error due to the wavelength shift is detected and thus re-measurement is performed, a measurement time becomes long. On the other hand, in the present embodiment, the error detection unit 175 determines whether or not the integration value I, which is obtained by integrating the absolute value $|\lambda-\lambda_0|$ of the difference between the spectral wavelength $\lambda$ and the target wavelength $\lambda_0$, exceeds the threshold value S. In this case, even when a wavelength shift having a value equal to or larger than a predetermined value occurs in a very short period within a measurement period, when the integration value I is equal to or smaller than the threshold value S, it is determined that the wavelength shift does not influence measurement accuracy. That is, an error is detected only when a wavelength shift having an influence on measurement accuracy occurs, and thus excessive error detection can be prevented. Thereby, the spectral apparatus 100 can quickly perform spectral measurement processing while maintaining desired measurement accuracy.

In the spectral apparatus 100 according to the present embodiment, the interference filter 110 includes the electrostatic actuator 116 that changes the size of the gap G. The filter driving unit 140 feedback-controls the voltage applied to the electrostatic actuator 116 such that the spectral wavelength $\lambda$ detected by the gap detection unit 130 approaches the target wavelength $\lambda_0$.

Thereby, in the spectral apparatus 100, the interference filter 110 can pass the light having the target wavelength $\lambda_0$ with high accuracy. Further, as long as an impact force such as a disturbance is not applied to the interference filter 110, the wavelength of the light passing through the interference filter 110 is maintained to the target wavelength $\lambda_0$ by the feedback control by the filter driving unit 140, and thus, a frequency of error detection by the error detection unit 175 is also decreased. Therefore, the spectral apparatus 100 can quickly perform spectral measurement processing with high accuracy.

Second Embodiment

Next, a second embodiment will be described.

In the first embodiment, the error detection unit 175 detects an error using the integration value obtained by integrating the absolute value of the difference between the spectral wavelength $\lambda$ based on the detection signal output from the gap detection unit 130 and the target wavelength $\lambda_0$. On the other hand, the second embodiment is different from the first embodiment in that an error is detected based on an integration value of a difference between a second value and the spectral wavelength and an integration value of a difference between a third value and the spectral wavelength, the second value being a value obtained by adding a predetermined first value to the target wavelength $\lambda_0$, and the third value being a value obtained by subtracting the first value from the target wavelength $\lambda_0$.

In the following description, the same reference numerals are given to the above-described components, and a description thereof is omitted or simplified.

Figure 5:
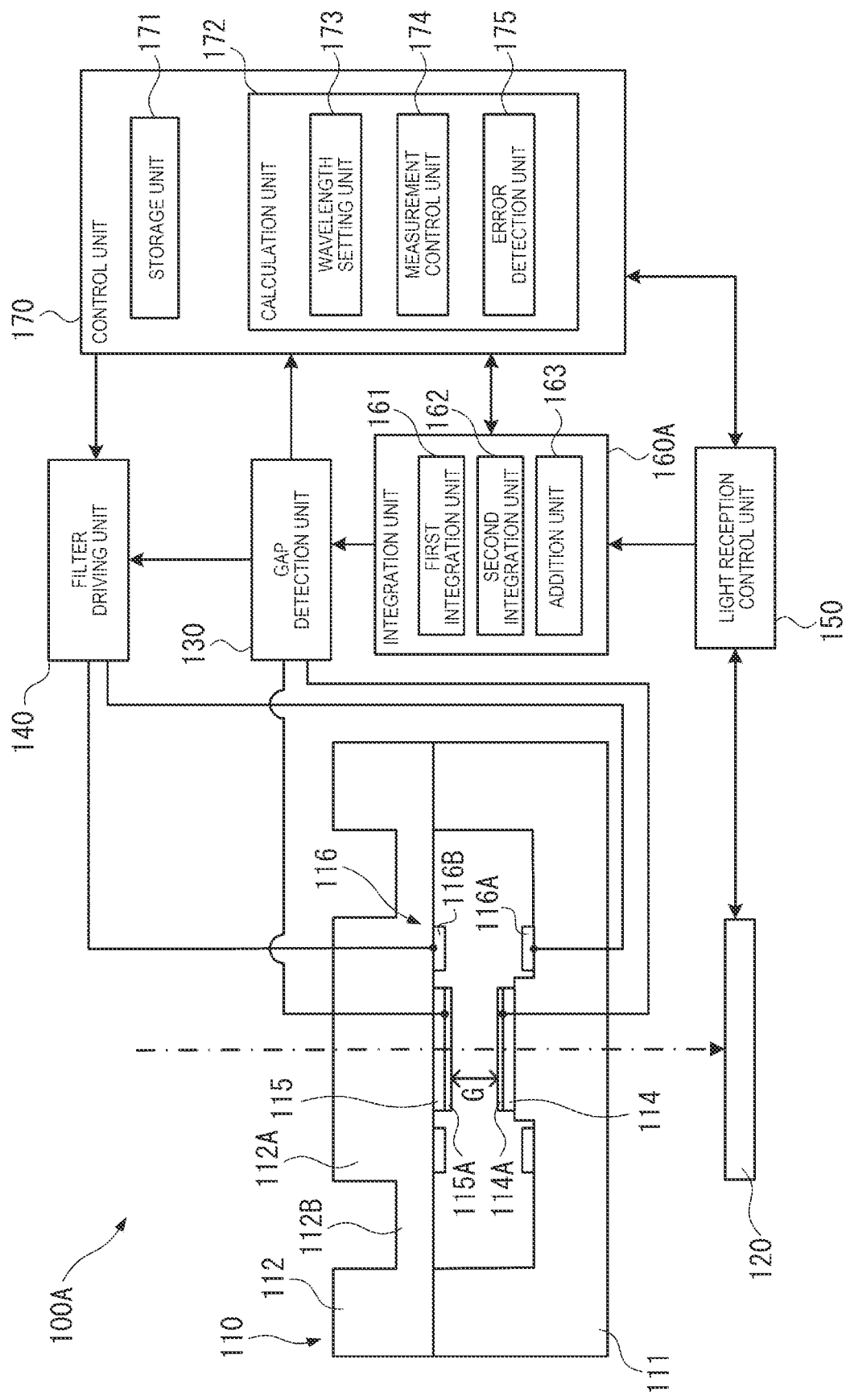
FIG. 5 is a schematic diagram illustrating a schematic configuration of a spectral apparatus according to a second embodiment.

FIG. 5 is a schematic diagram illustrating a schematic configuration of the spectral apparatus 100A according to the second embodiment.

As illustrated in FIG. 5, the spectral apparatus 100A according to the second embodiment has a configuration substantially similar to the configuration of the first embodiment, and includes an interference filter 110, a light reception unit 120, a gap detection unit 130, a filter driving unit 140, a light reception control unit 150, an integration unit 160A, and a control unit 170.

Further, the control unit 170 includes a storage unit 171 and a calculation unit 172, and as in the first embodiment, the calculation unit 172 functions as a wavelength setting unit 173, a measurement control unit 174, an error detection unit 175, and the like.

Figure 6:
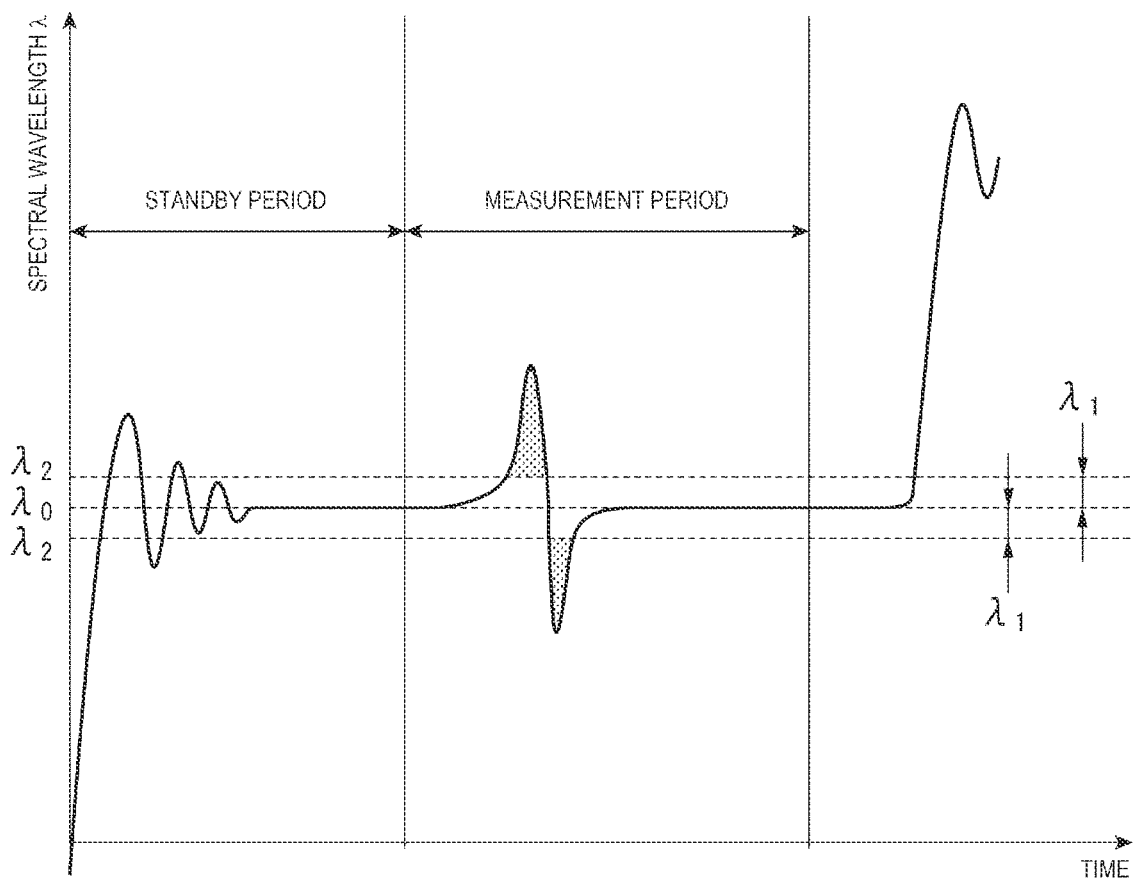
FIG. 6 is a graph illustrating an example of a change in spectral wavelength of light passing through an interference filter in the second embodiment.

FIG. 6 is a graph illustrating an example of a change in the spectral wavelength of the light passing through the interference filter 110 in error detection according to the present embodiment.

In the present embodiment, the integration unit 160A includes a first integration unit 161, a second integration unit 162, and an addition unit 163.

Here, in the present embodiment, as illustrated in FIG. 6, a value obtained by adding a first value $\lambda_1$ to the target wavelength $\lambda_0$ is set as a second value $\lambda_2$ $(=\lambda_0+\lambda_1)$, and a value obtained by subtracting the first value $\lambda_1$ from the target wavelength $\lambda_0$ is set as a third value $\lambda_3$ $(=\lambda_0-\lambda_1)$.

The first integration unit 161 calculates a first integration value $I_1$ by integrating, on the time axis, a difference $\lambda-\lambda_2$ between the spectral wavelength $\lambda$ based on the detection signal exceeding the second value $\lambda_2$ and the second value $\lambda_2$. The second integration unit 162 calculates a second integration value $I_2$ by integrating, on the time axis, a difference $\lambda_3-\lambda$ between the third value $\lambda_3$ and the spectral wavelength $\lambda$ based on the detection signal below the third value $\lambda_3$. The addition unit 163 obtains an integration value I of the wavelength shift amount by adding the first integration value $I_1$ and the second integration value $I_2$.

The first integration unit 161, the second integration unit 162, and the addition unit 163 may be configured with a microcomputer as in the first embodiment, or may be configured with a plurality of arithmetic circuits. Alternatively, the calculation unit 172 of the control unit 170 may function as the integration unit 160A.

The spectral apparatus 100A according to the present embodiment can perform spectral measurement processing by the same driving method as in the first embodiment illustrated in FIG. 2. In the present embodiment, the integration value I output from the integration unit 160A in step S7 is the sum of the first integration value $I_1$ and the second integration value $I_2$.

The other operations are the same as the operations in the first embodiment, and thus a description thereof is omitted.
Operation and Effect According to Present Embodiment The spectral apparatus 100A according to the present embodiment includes the interference filter 110 including the first reflection film 114 and the second reflection film 115 that face each other with the gap G, the gap detection unit 130 that detects the size of the gap G, and the control unit 170. The control unit 170 includes the error detection unit 175 that detects an error based on the second value $\lambda_2$ obtained by adding the predetermined first value $\lambda_1$ to the target wavelength $\lambda_0$, the third value $\lambda_3$ obtained by subtracting the first value $\lambda_1$ from the target wavelength $\lambda_0$, and the spectral wavelength $\lambda$ corresponding to the gap size detected by the gap detection unit 130. Specifically, the error detection unit 175 detects an error when the integration value I $(=I_1+I_2)$, which is the sum of the first integration value $I_1$ and the second integration value $I_2$, exceeds the threshold value S, the first integration value $I_1$ being obtained by integrating the absolute value $|\lambda-\lambda_2|$ of the difference between the spectral wavelength $\lambda$ exceeding the second value $\lambda_2$ and the second value $\lambda_2$, and the second integration value $I_2$ being obtained by integrating the absolute value $|\lambda_3-\lambda|$ of the difference between the spectral wavelength $\lambda$ below the third value $\lambda_3$ and the third value $\lambda_3$.

In this case, a noise component of the detection signal generated in a wavelength range of $\lambda_0-\lambda_1$ to $\lambda_0+\lambda_1$ in which the target wavelength $\lambda_0$ is set as a center is not integrated into the integration value I. Further, only when the difference $\lambda-\lambda_2$ and the difference $\lambda_3-\lambda$ are positive, integration is performed, and when the differences are negative, integration is not performed. As a result, in a state where noise components are excluded, error detection can be performed. Therefore, excessive error detection can be prevented, and thus error detection can be more properly performed. Accordingly, the spectral apparatus 100A can more quickly perform spectral measurement processing.

Third Embodiment

Next, a third embodiment will be described.

In the first embodiment and the second embodiment, the error detection unit 175 detects an error indicating that a wavelength shift having an influence on measurement accuracy occurs when the integration value I calculated by the integration units 160 and 160A exceeds the threshold value S. On the other hand, the third embodiment is different from the first embodiment and the second embodiment in that the threshold value S is changed according to the measurement time.

Figure 7:
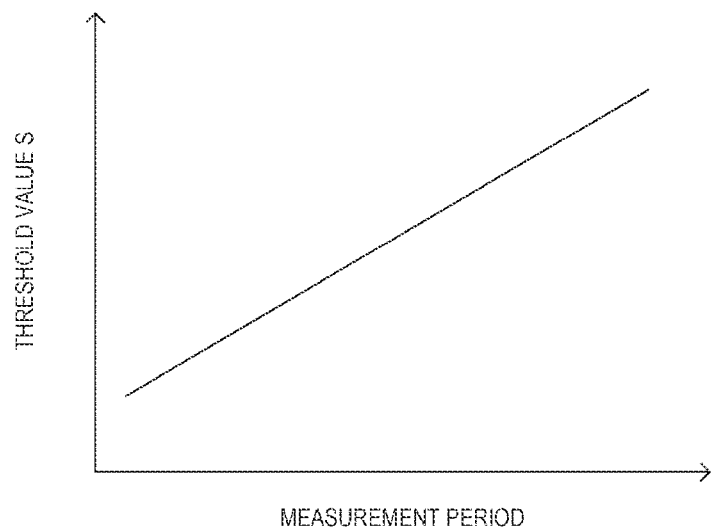
FIG. 7 is a graph illustrating an example of relationship data according to a third embodiment.

FIG. 7 is a diagram illustrating an example of relationship data stored in the storage unit 171 according to the third embodiment.

In the third embodiment, in the spectral apparatus 100 having the same configuration as the configuration of the first embodiment illustrated in FIG. 1, relationship data as illustrated in FIG. 7 is stored in the storage unit 171. Although the example in which the relationship data is stored in the storage unit 171 according to the first embodiment is used, the relationship data may be stored in the storage unit 171 according to the second embodiment.

The relationship data is data indicating a relationship between the threshold value S and an elapsed time (measurement time) from the measurement start timing in a measurement period. In the present embodiment, as illustrated in FIG. 7, the threshold value S is set such that the threshold value S linearly increases as the measurement time increases.

In the present embodiment, the light reception control unit 150 outputs a start trigger signal to the integration unit 160 and the control unit 170 at a timing at which the measurement processing in step S5 of FIG. 2 is started.

Further, the error detection unit 175 counts an elapsed time from the measurement start timing when the start trigger signal is received, that is, a measurement time. In step S8, the error detection unit 175 reads the threshold value S corresponding to the counted measurement time from the relationship data stored in the storage unit 171, and determines whether or not the integration value I of the integration signal which is input from the integration unit 160 exceeds the read threshold value S.

The other processing is the same as the processing described above.

Operation and Effect According to Present Embodiment

In the spectral apparatus 100 according to the present embodiment, the error detection unit 175 increases the threshold value S according to the measurement time, which is an elapsed time from the light reception start timing when the light reception unit 120 receives light.

Thereby, error detection can be properly performed according to the measurement time. That is, in the present embodiment, the error detection unit 175 can detect an error based on a ratio of the frequency of occurrence of the wavelength shift to the measurement time, and thus error detection can be more properly performed.

MODIFICATION EXAMPLES

The present disclosure is not limited to the above-described embodiments, and modifications, improvements, and the like within the scope in which the object of the present disclosure can be achieved are included in the present disclosure.

Modification Example 1

In the embodiment, when the error detection unit 175 detects an error in step S9, the measurement control unit 174 outputs a re-measurement instruction signal to the light reception control unit 150 in step S10, and the light reception control unit 150 transitions to a measurement period when a standby period is ended and starts measurement processing by the light reception unit 120. In this case, when a change in the size of the gap G due to a disturbance is settled in a standby period, by performing re-measurement processing, it is possible to properly measure the amount of the received light having the target wavelength.

On the other hand, when an error is detected in step S9, the measurement control unit 174 monitors an amount of a change in the integration value of the integration signal per unit time, and further determines whether or not the amount of the change is within an allowable value. In a case where it is determined that the amount of the change in the integration value is within the allowable value, the measurement control unit 174 may output a re-measurement instruction signal to the light reception control unit 150. That is, the spectral apparatus 100 may determine whether or not a change in the size of the gap G of the interference filter 110 is settled, and when it is determined that the change in the size of the gap G is settled, may instruct re-measurement processing.

In this case, the light reception control unit 150 may immediately start measurement processing in a measurement period without a standby period.

Further, the measurement control unit 174 may monitor an amount of a change in the detection signal per unit time, which is detected by the gap detection unit 130, instead of the amount of the change in the integration value of the integration signal per unit time. Even in this case, the measurement control unit 174 performs re-measurement processing when the amount of the change in the detection signal per unit time is within a predetermined allowable value.

Modification Example 2

In the embodiment, the light reception control unit 150 counts a time from the timing when a measurement instruction signal or a re-measurement instruction signal is received, and when it is determined that a standby period is ended, transitions to a measurement period and starts processing of measuring an amount of the received light. On the other hand, the present disclosure is not limited thereto. For example, the light reception control unit 150 may monitor an amount of a change in the signal value of the detection signal per unit time or an amount of a change in the integration value per unit time, and when the amount of the change is equal to or less than a predetermined allowable value, transition to a measurement period and perform measurement processing.

Modification Example 3

In the third embodiment, an elapsed time from the measurement start timing is set as a measurement time, and the threshold value S is changed according to the measurement time. On the other hand, by using the light reception unit 120 that can change a length of a measurement period according to, for example, a measurement target or a measurement environment, a length of a measurement period in the light reception unit 120 may be set as a measurement time, and the threshold value S may be changed according to the measurement time. That is, when the measurement period is short, the error detection unit 175 may detect an error by decreasing the threshold value S, and when the measurement period is long, the error detection unit 175 may detect an error by increasing the threshold value S. In a case where the measurement period is long, noise included in the detection signal becomes large, and the integration value I also tends to be large. As a result, when the same threshold value S as when the measurement period is short is used, excessive error detection may be performed. Further, when the measurement period is long, a ratio of a time during which the light having the target wavelength $\lambda_0$ is received becomes long, and as a result, an influence on measurement accuracy due to a wavelength shift is reduced. Therefore, by changing the threshold value S according to the length of the measurement period, it is possible to properly perform spectral measurement processing while preventing excessive error detection.

Modification Example 4

In the embodiment, the spectral apparatuses 100 and 100A are spectral measurement apparatuses, and include the light reception unit 120 that receives the light passing through the interference filter 110. On the other hand, the present disclosure is not limited thereto.

For example, the spectral apparatus may be a light source apparatus that outputs light passing through the interference filter 110 to the outside. In a case where the spectral apparatus is used as a light source apparatus, the light reception unit 120 is not necessary, and a light source such as a white light source is provided instead. The light emitted from the light source is guided to the interference filter 110, and the interference filter 110 disperses the light having a predetermined spectral wavelength and outputs the dispersed light. In this case, the spectral apparatus can continuously output the light having the spectral wavelength by setting the size of the gap G of the interference filter 110 and maintaining the size of the gap G of the interference filter 110.

In this way, when the spectral apparatus functions as the light source apparatus, the error detection unit 175 may determine whether or not a value of the integration value I in a lighting period for which light is output exceeds the threshold value S.

The lighting period of the light source apparatus is often sufficiently longer than the measurement period of the spectral measurement apparatus. Therefore, preferably, the lighting period is divided into a plurality of small periods, and error detection is performed in each small period.

For example, when the lighting period includes a first small period and a second small period following the first small period, the integration value I of the integration unit is reset at the start of the first small period, and the error detection unit performs error detection processing of determining whether or not an error occurs, based on the integration signal output from the integration unit in the first small period. When the first small period is ended and the second small period is started, the integration value I is reset at the start of the second small period, and the error detection unit performs error detection processing based on the integration signal output from the integration unit in the second small period.

Alternatively, an error determination timing may be periodically provided in the lighting period, and error detection processing may be performed at a predetermined time interval from each error determination timing. In this case, in the lighting period, error detection processing is intermittently performed.

Modification Example 5

In the embodiment, the interference filter 110 includes the electrostatic actuator 116, and is configured to change the size of the gap G. On the other hand, the interference filter 110 may be an interference filter with a fixed wavelength. That is, an interference filter that can pass only a predetermined target wavelength $\lambda_0$ which is preset may be used.

Other Modification Examples

Although the interference filter 110 includes the electrostatic actuator 116 as a gap changing unit, the configuration of the gap changing unit is not limited thereto. For example, a piezoelectric actuator such as a piezo element may be disposed between the first board 111 and the second board 112, and the size of the gap G may be changed by applying a voltage to the piezoelectric actuator.

The light reception unit 120 is configured to receive the light passing through the interference filter 110. On the other hand, the present disclosure is not limited thereto. For example, as the interference filter, a reflection type filter that reflects light having a spectral wavelength corresponding to the size of the gap G may be used. In this case, the light reception unit 120 may receive the light reflected by the interference filter 110.

Overview of Present Disclosure

A spectral apparatus according to a first aspect of the present disclosure includes: an interference filter that includes a pair of reflection films and outputs light having a spectral wavelength corresponding to a gap size between the pair of reflection films; a gap sensor that detects the gap size; and one or more processors configured to detect an error based on a difference between the spectral wavelength corresponding to the gap size detected by the gap sensor and a target wavelength of light to be output from the interference filter, in which the one or more processors detect an error when an integration value obtained by integrating, on a time axis, an absolute value of the difference exceeds a threshold value.

Thereby, an error is detected only when a wavelength shift having an influence on measurement accuracy occurs, and thus excessive error detection can be prevented.

A spectral apparatus according to a second aspect of the present disclosure includes: an interference filter that includes a pair of reflection films and outputs light having a spectral wavelength corresponding to a gap size between the pair of reflection films; a gap sensor that detects the gap size; and one or more processors configured to detect an error based on a second value obtained by adding a predetermined first value to the target wavelength to be output from the interference filter, a third value obtained by subtracting the first value from the target wavelength, and the spectral wavelength corresponding to the gap size detected by the gap sensor, in which the one or more processors detect an error when a sum of a first integration value and a second integration value exceeds a threshold value, the first integration value being obtained by integrating an absolute value of a difference between the spectral wavelength exceeding the second value and the second value, and the second integration value being obtained by integrating an absolute value of a difference between the spectral wavelength below the third value and the third value.

Thereby, similar to the spectral apparatus according to the first aspect, an error is detected only when a wavelength shift having an influence on measurement accuracy occurs, and thus excessive error detection can be prevented. Further, noise in the gap sensor is prevented from being detected, and thus it is possible to more properly detect an error.

Preferably, the spectral apparatus according to the first aspect and the second aspect further includes a light reception unit that receives the light output from the interference filter and measures an amount of the received light. In the spectral apparatus, preferably, the one or more processors increase the threshold value according to a time from a light reception start timing when the light reception unit receives the light.

Thereby, the one or more processors can detect an error based on a ratio of a frequency of occurrence of a wavelength shift to a time when measurement is performed by the light reception unit, and thus it is possible to more properly detect an error.

In the spectral apparatus according to the first aspect and the second aspect, preferably, the interference filter includes a gap changing unit that changes the gap size, and the one or more processors feedback-control the gap changing unit such that the spectral wavelength detected by the gap sensor approaches the target wavelength.

Thereby, the gap size between the pair of reflection films of the interference filter is feedback-controlled to be always the target wavelength, and thus a wavelength shift in which the spectral wavelength is shifted from the target wavelength is prevented. Therefore, a frequency of error detection can be decreased.

A method of driving a spectral apparatus according to a third aspect of the present disclosure includes an interference filter that includes a pair of reflection films and outputs light having a spectral wavelength corresponding to a gap size between the pair of reflection films, and a gap sensor that detects the gap size, the method including: detecting an error when an integration value exceeds a threshold value, the integration value being obtained by integrating an absolute value of a difference between the spectral wavelength corresponding to the gap size detected by the gap sensor and a target wavelength of light to be output from the interference filter.

Thereby, similar to the spectral apparatus according to the first aspect, an error is detected only when a wavelength shift having an influence on measurement accuracy occurs, and thus excessive error detection can be prevented.

A method of driving a spectral apparatus according to a fourth aspect of the present disclosure includes an interference filter that includes a pair of reflection films and outputs light having a spectral wavelength corresponding to a gap size between the pair of reflection films, and a gap sensor that detects the gap size, the method including: detecting an error when a sum of a first integration value and a second integration value exceeds a threshold value, based on a second value obtained by adding a predetermined first value to the target wavelength to be output from the interference filter, a third value obtained by subtracting the first value from the target wavelength, and the spectral wavelength corresponding to the gap size detected by the gap sensor, the first integration value being obtained by integrating an absolute value of a difference between the spectral wavelength exceeding the second value and the second value, and the second integration value being obtained by integrating an absolute value of a difference between the spectral wavelength below the third value and the third value.

Thereby, similar to the spectral apparatus according to the second aspect, excessive error detection can be prevented, and noise in the gap sensor is prevented from being detected. Therefore, it is possible to more properly detect an error.

What is claimed is:

1. A spectral apparatus comprising:
    an interference filter that includes a pair of reflection films and outputs light having a spectral wavelength corresponding to a gap size between the pair of reflection films;
    a gap sensor that detects the gap size; and
    a light reception unit that receives the light output from the interference filter and measures an amount of the received light; and
    one or more processors configured to:
        detect an error based on a difference between the spectral wavelength corresponding to the gap size detected by the gap sensor and a target wavelength of light to be output from the interference filter, wherein
        the one or more processors detect the error when an integration value obtained by integrating, on a time axis, an absolute value of the difference exceeds a threshold value, and
        the threshold value indicates a wavelength shift amount that does not influence spectral measurement accuracy; and
        output, based on the detection of the error, an instruction signal to re-measure the amount of the received light with respect to the target wavelength.

2. A spectral apparatus comprising:
    an interference filter that includes a pair of reflection films and outputs light having a spectral wavelength corresponding to a gap size between the pair of reflection films;
    a gap sensor that detects the gap size; and
    one or more processors configured to detect an error based on a second value obtained by adding a predetermined first value to a target wavelength to be output from the interference filter, a third value obtained by subtracting the predetermined first value from the target wavelength, and the spectral wavelength corresponding to the gap size detected by the gap sensor, wherein
    the one or more processors detect an error when a sum of a first integration value and a second integration value exceeds a threshold value,
    the first integration value is obtained by integrating, on a time axis, an absolute value of a difference between the spectral wavelength and the second value within a specified period,
    the spectral wavelength exceeds the second value,
    the second integration value is obtained by integrating, on the time axis, an absolute value of a difference between the spectral wavelength and the third value within the specified period, and
    the spectral wavelength is less than the third value.

3. The spectral apparatus according to claim 1, wherein the one or more processors increase the threshold value according to a time from a light reception start timing when the light reception unit receives the light.

4. The spectral apparatus according to claim 1, wherein the interference filter includes a gap changing unit that changes the gap size, and
    the one or more processors feedback-control the gap changing unit such that the spectral wavelength detected by the gap sensor approaches the target wavelength.

5. The spectral apparatus according to claim 1, wherein, the one or more processors linearly increases the threshold value based on a time that elapses from a light reception start timing when the light reception unit receives the light.

6. The spectral apparatus according to claim 1, wherein, the one or more processors monitors an amount of a change in the integration value per unit time when the error is detected, and
    the one or more processors output the instruction signal to re-measure the amount of the received light with respect to the target wavelength in a case where the amount of the change in the integration value is within an allowable value.

7. The spectral apparatus according to claim 1, wherein, the one or more processors sets the threshold value to a first threshold value when a measurement period is a first period, and sets the threshold value to a second threshold value when the measurement period is a second period,
    the measurement period is a period during which the light reception unit outputs a received light signal according to the amount of the received light,
    the first period is shorter than the second period, and
    the fist threshold value is less than the second threshold value.

8. A method of driving a spectral apparatus including an interference filter that includes a pair of reflection films and outputs light having a spectral wavelength corresponding to a gap size between the pair of reflection films, and a gap sensor that detects the gap size, the method comprising:
    receiving the light output from the interference filter;
    measuring an amount of the received light;
    detecting an error when an integration value exceeds a threshold value, the integration value being obtained by integrating an absolute value of a difference between the spectral wavelength corresponding to the gap size detected by the gap sensor and a target wavelength of light to be output from the interference filter, wherein the threshold value indicates a wavelength shift amount that does not influence spectral measurement accuracy; and outputting, based on the detection of the error, an instruction signal to re-measure the amount of the received light with respect to the target wavelength.

9. A method of driving a spectral apparatus including an interference filter that includes a pair of reflection films and outputs light having a spectral wavelength corresponding to a gap size between the pair of reflection films, and a gap sensor that detects the gap size, the method comprising:

detecting an error when a sum of a first integration value and a second integration value exceeds a threshold value, based on a second value obtained by adding a predetermined first value to the target wavelength to be output from the interference filter, a third value obtained by subtracting the predetermined first value from the target wavelength, and the spectral wavelength corresponding to the gap size detected by the gap sensor, wherein the first integration value is obtained by integrating, on a time axis, an absolute value of a difference between the spectral wavelength and the second value within a specified period, the spectral wavelength exceeds the second value, the second integration value is obtained by integrating, on the time axis, an absolute value of a difference between the spectral wavelength and the third value within the specified period, and the spectral wavelength is less the third value.

* * * * *